UNITED STATES PATENT OFFICE.

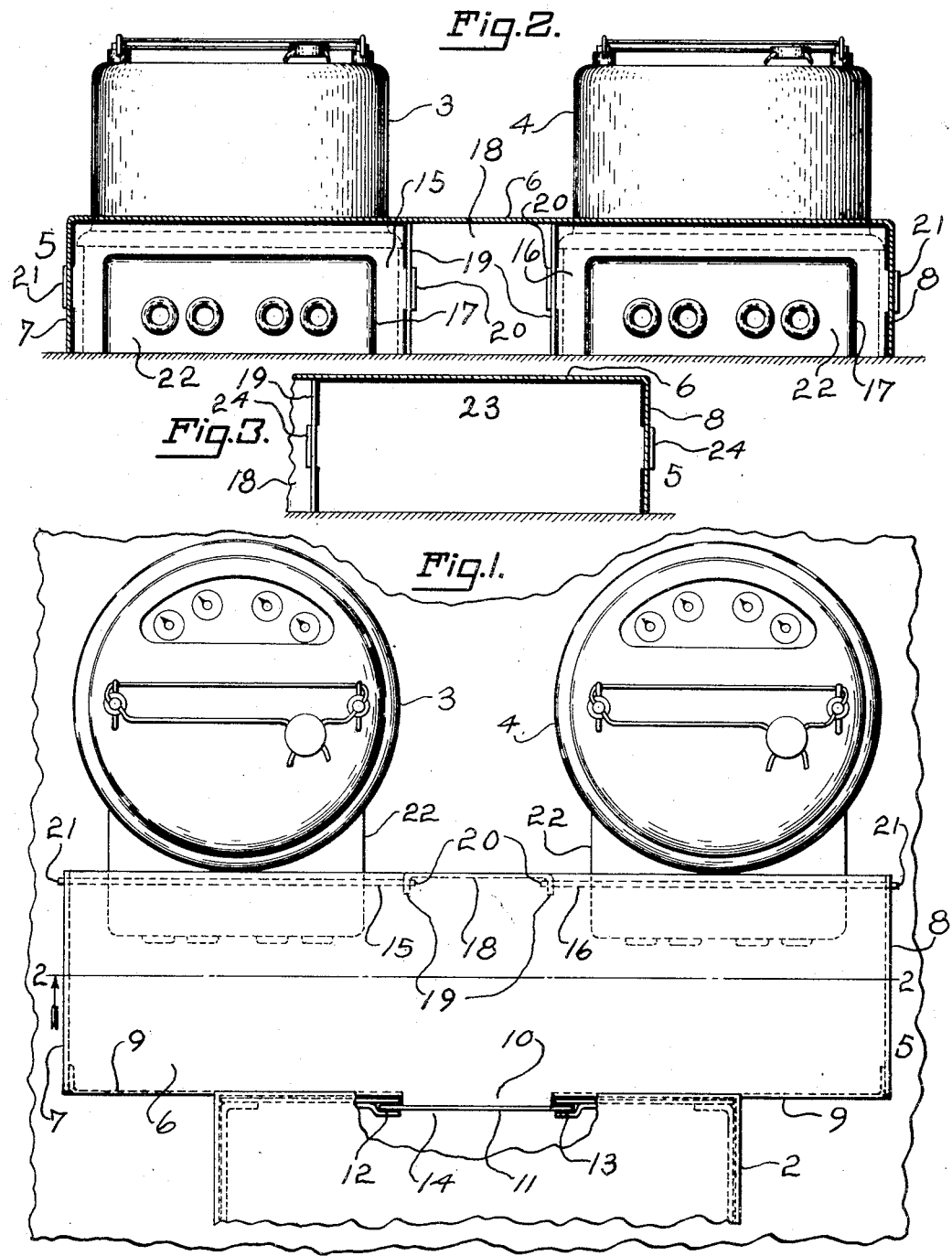

JOSEPH SACHS, OF HARTFORD, CONNECTICUT.

MULTIPLE-METER ADAPTER.

1,245,037. Specification of Letters Patent. Patented Oct. 30, 1917.

Application filed July 26, 1916. Serial No. 111,385.

*To all whom it may concern:*

Be it known that I, JOSEPH SACHS, a citizen of the United States, residing at Hartford, in the county of Hartford and State of Connecticut, have invented certain new and useful Improvements in Multiple-Meter Adapters, of which the following is a specification.

This invention relates to a multiple meter adapter. It is more or less common in certain meter installations to provide in association with a meter what is termed "an adapter." So far as I am aware, it has been the invariable practice where adapters are used, to provide each meter with its individual adapter. As may be inferred, the primary purpose of this invention is the provision of an article of this kind capable, if required, of association or correlation with a plurality of meters; that is to say two or more. While I do not restrict myself to any particular construction adaptable to obtain the function in question, I have nevertheless in the drawings accompanying and forming part of the present specification shown one convenient form of device, which is eminently satisfactory. This I will set forth in detail in the following description. Obviously from the observation already made, I do not restrict myself to such disclosure; I may depart therefrom in several respects within the scope of the invention defined by the claims following said description.

Referring to said drawings:

Figure 1 is a front elevation of a meter installation involving the invention.

Fig. 2 is a horizontal section on the line 2—2 of Fig. 1, looking in the direction of the arrow.

Fig. 3 is a section on the same line of part of the adapter with an imperforate closure plate positioned.

Like characters refer to like parts throughout the several views.

In certain meter installations as illustrated in the drawings for instance, there is a suitable box such as that denoted by 2. This box is adapted to contain one or more electrical appliances such for instance as an electric switch, cut out or meter connection and testing means. The meter installation shown comprises a plurality of meters. While there may be any desirable number, I have shown merely two denoted respectively by 3 and 4. In the construction shown the wires from the switch or other appliance or appliances inclosed by the box 2 extend to the two meters, and the adapter, as will be obvious, receives these wires and naturally the adapter prevents tampering therewith and with the meter terminals. An adapter such as that denoted in a general way by 5 is satisfactory. In the organization shown this adapter is in coöperative relation with the box and with a meter or meters.

The adapter has a front, a box-coöperative end, a meter coöperative end and two sides, the back being open generally. While the adapter is shown as practically oblong, it may be of any other desirable shape.

What I have termed the "meter coöperative-end" of the adapter subserves an important function. It constitutes closure means for the adapter or what might be considered adapting means. That is it adapts the adapter to the particular style of meter or meters, for as will be clear, the adapter is not only usable in conjunction with different kinds of meters at the same time, but it may under certain conditions be associated with but one meter, while it can be readily changed over to receive an additional meter or meters. As will be apparent, therefore, the closure or adapting means is of such kind as to meet the requirements. I do not restrict myself to any particular kind of closure or adapting means, the invention being general in this respect. As a matter of desirability, however, this closure or adapting means consists of several plates, one or more of which may be slotted, notched or otherwise formed to conform to a definite style of meter and one or more of which may be blank or plain, that is uncut.

I will first refer to Figs. 1 and 2 wherein I show the adapter 5 as equipped with closure means to receive the terminal portions of a plurality of meters—two being shown. In Fig. 3, however, the closure means is of a different character, having in its organization a plain or blank plate such as that to which I have alluded. Referring now more definitely to said Figs. 1 and 2, the adapter body comprises the front 6, the sides 7 and 8 and the box coöperative end 9. This box coöperative end usually consists of companion flanges or lips bent backward from the front 6 and abutting against the sides 7 and 8 and laterally separated at their inner edges to provide a wire way 10. The box coöperative end is provided with means which may vary radically to provide for its union with a box or cabinet as 2. As illustrated this union is obtained by an interlocking joint, for example of tongue and groove type. As shown the box coöperative end 9 is furnished with a tongue as 11 slidable in parallel ways as 12 and 13 at opposite sides of the wire opening 14 in the box, which wire opening 14, as will be understood, registers with the wire opening 10. As I have already noted, the meter coöperative end of the adapter may be of any suitable nature. It is advantageously constituted by a number of closure plates. The character of these plates will depend upon the conditions to be met. There may be an instance where a multi-meter adapter might require to be used in connection with a single meter, and in this event one of the plates will be notched or slotted, while another would be plain or blank; that is uncut. These closure plates are removably associable with the meter adapter body and are interchangeable.

In Figs. 1 and 2 the adapter body is provided with separate closure plates, members or elements as 15 and 16, each suitably notched or slotted as at 17 to coöperate with its individual meter. As shown the plate 15 coöperates with the meter 3, while the plate 16 performs a similar office with respect to the meter 4. The meter coöperative end of the adapter body therefore, comprises closure plates, members or elements, of which those designated by 15 and 16 are illustrative. In the organization shown the remainder of this meter coöperative end consists of a web or flange 18 extending backwardly from the front 6 at what is shown as the upper portion of the adapter body. This approximately central backwardly extending flange or web 18 has inturned lips as 19 slotted to receive the tongues 20 at the inner ends of the closure plates 15 and 16, the outer ends of said closure plates having tongues as 21 which likewise removably fit slots in the sides 7 and 8 of the adapter body, the several slots being alined longitudinally of the adapter.

It will be observed that the terminal chambers 22 of the meters 3 and 4 project into the adapter body and as constructed that the removable closure plates 15 and 16 are notched to straddle and fit edgewise against or around these terminal chambers, so that in this particular installation the meters, the closure plates and the intermediate web or flange 18 collectively close and protect the meter coöperative end of the adapter body. I have shown one of several advantageous ways of removably mounting the closure plates. By virtue of this removable mounting it is a simple matter at any time to take one or more of them from place and substitute one of a different character therefor should the case require it. To facilitate the application and removal of these closure plates, they are preferably made of bendable material. To insert them, they are slightly bent and the tongues 20 and 21 introduced into the appropriate slots when said plates are flattened. When the tongues are firmly seated in and project through their appropriate receiving slots, said plates are firmly and substantially locked and held in position to the adapter body.

I have already referred to one advantage of removable closure plates or more broadly considered removable closure means for the meter coöperating end of the adapter. Another advantage follows this feature of removability for the following reason: It is necessary at times to remove a meter and yet afford protection to the remaining meter or meters. This can be accomplished by dismounting the particular meter and removing its coöperative closure plate. To obtain the necessary protection, therefore, a blank or uncut closure plate is substituted for the one thus removed. This closure plate can be of any desirable nature. In Fig. 3 I have shown a plate 23 which meets all the requirements. This plate is plain or blank, and it has tongues 24 which function exactly like the tongues 20 and 21. This plate 23 is mounted and dismounted exactly like the plates 15 and 16. As a matter of fact except that it is plain or blank it is exactly like the cut or notched plates. In some instances it may be necessary to remove all the meters. In this event the adapter body can be closed in some suitable way. If constructed as already described, several of these plain plates will be mounted.

What I claim is:

1. A meter adapter provided with means for its coöperative association with a plurality of meters.

2. A meter adapter provided with means at one end for its coöperative association with an electric appliance containing box and provided with means at another end for its coöperative association with a plurality of meters.

3. A meter adapter provided with a meter coöperative portion comprising means for its coöperative protective association with a plurality of meters.

4. A meter adapter provided with a meter coöperative portion comprising means protectively coöperative with a plurality of meters.

5. A meter adapter provided with a body and with a meter coöperative portion serving to protectively coöperate with a plurality of meters at the same time, said meter coöperative portion comprising separate closure members individually coöperative with a single meter.

6. A meter adapter provided with means for its protective association with a plurality of meters at the same time, said meter protective coöperating part of the adapter having means whereby upon the removal of any one or more of said meters the protective functioning of the adapter is still maintained.

7. A meter adapter provided with means for its protective coöperative association with a plurality of meters, the protective portion of said adapter being sectional to permit of the removal of one or more of said meters and for protectively closing the opening left by such removal in order to maintain the protective functioning of the adapter at all times.

8. A meter adapter comprising a body having removable meter coöperative closure members coöperative respectively with a plurality of meters.

9. In a meter protecting appliance, means for coöperative relation with a plurality of meters, and means for providing a covered and protective wire passage from each of said meters to an electric appliance containing box common to said meters.

10. A meter adapter provided with means for its coöperative association simultaneously with a plurality of meters combined with means to effect the protective connection therewith of less than the other number.

11. A meter adapter body comprising a front and sides, the body being formed to receive a plurality of meters between the sides and removable closure means extending between the sides.

12. In a meter protecting appliance, body means extending from an electric appliance containing box to a plurality of meters, and means coöperative with said body means and in protective relation with a plurality of meters.

13. In a meter protecting appliance a protective body adapted at one end for union with an electric appliance containing box and at another end with adapting means for a plurality of meters, said adapting means being constructed to permit the use of two different meters with the same adapter.

14. A meter adapter comprising a body having a front and sides and a portion intermediate the sides, and removable closure members extending between the sides and said intermediate portion.

In testimony whereof I affix my signature in the presence of two witnesses.

JOSEPH SACHS.

Witnesses:
L. L. MARKEL,
HEATH SUTHERLAND.